United States Patent
Benveniste et al.

(10) Patent No.: US 6,587,923 B1
(45) Date of Patent: Jul. 1, 2003

(54) DUAL LINE SIZE CACHE DIRECTORY

(75) Inventors: Caroline D. Benveniste, New York, NY (US); Peter A. Franaszek, Kisco, NY (US); John T. Robinson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,549

(22) Filed: May 22, 2000

(51) Int. Cl.[7] ............................................... G06F 12/06
(52) U.S. Cl. ........................ 711/122; 711/144; 711/128
(58) Field of Search ................................. 711/122, 128, 711/117, 141, 142, 143, 144, 146, 145, 171

(56) References Cited

U.S. PATENT DOCUMENTS

| | | | | |
|---|---|---|---|---|
| 5,369,753 A | * | 11/1994 | Tipley | 711/122 |
| 5,696,935 A | * | 12/1997 | Grochowski et al. | 365/230.05 |
| 5,943,686 A | * | 8/1999 | Arimilli et al. | 711/146 |
| 5,996,048 A | * | 11/1999 | Cherabuddi et al. | 711/119 |
| 6,000,015 A | * | 12/1999 | Whittaker | 711/134 |
| 6,044,478 A | * | 3/2000 | Green | 711/141 |
| 6,092,153 A | * | 7/2000 | Lass | 711/133 |
| 6,138,209 A | * | 10/2000 | Krolak et al. | 711/128 |
| 6,243,791 B1 | * | 6/2001 | Vondran, Jr. | 711/120 |
| 6,401,172 B1 | * | 6/2002 | Prudvi et al. | 711/141 |

OTHER PUBLICATIONS

Handy, Jim. "Cache Memory Book", Academic Press, Inc., 1998, pp. 89–93.*
IBM Technical Disclosure Bulletin, "Preemptible cache line prefetch algorithm and implementation", Aug. 1990, vol. 33, issue 3 pp. 371–373.*

* cited by examiner

*Primary Examiner*—Matthew Kim
*Assistant Examiner*—Pierre-Michael Bataille
(74) *Attorney, Agent, or Firm*—Scully, Scott, Murphy & Presser; Derek S. Jennings

(57) ABSTRACT

In a computer system having a processor, a memory system including multiple levels of caches $L_1, L_2, \ldots, L_{n-1}$ and including main memory $L_n$, and in which the cache $L_{i-1}$ includes lines of size s and the cache $L_i$ includes lines of size t with t>s, a dual line size cache directory mechanism, in which the contents of a cache $L_{i-1}$ may be accessed at line size granularity s (in which case it is determined whether a line corresponding to a given memory address is stored in $L_{i-1}$, and if so its location and status), and in which the contents of $L_{i-1}$ may also be accessed at line size granularity t (in which case it is determined whether any of the t/s lines of size s residing in the larger line of size t corresponding to a given memory address are stored in $L_{i-1}$, and if so their locations and status) without multiple sequential accesses to a cache $L_{i-1}$ directory structure.

13 Claims, 4 Drawing Sheets

$L_{i-1}$ Cache Directory (line size s =256)

$L_{i-1}$ Cache Directory (line size s =256)

DUAL LINE SIZE CACHE DIRECTORY

FIELD OF THE INVENTION

The present invention relates generally to memory addressing schemes in computer systems, and specifically, to a cache directory structure and cache memory access method for reducing memory access latency in systems employing multiple cache memory levels.

BACKGROUND OF THE INVENTION

The design and use of caches in computer systems is a well-known and widely studied area in the field of memory hierarchy design (for example, see the text books *High Performance Computer Architecture,* by Harold Stone, third edition, Addison-Wesley, 1993, chapter 2 (herein referred to as "Stone"), and *Computer Architecture A Quantitative Approach,* by John Hennessy and David Patterson, second edition, Morgan Kaufman, 1996, chapter 5). Presently, typical computer systems have two levels of caching, where the caches are referred to as the L1 and L2 caches, above main memory. The units of transfer between the L1 and L2 caches, and between the L2 cache and main memory, are referred to as cache lines. Today, typical computer systems have a fixed line size, usually with the same line size for the L1 and L2 caches.

As main memory sizes increase, a third level (L3) cache may become necessary for efficient operation. The L3 cache may have a larger line size than that of the L1 and L2 caches. Furthermore, in computer system designs that utilize main memory compression, logically fixed size units in main memory are automatically stored in compressed form and decompressed on cache misses. In such designs, the logically fixed size units of main memory occupy varying amounts of space (due to compression). A number of techniques for efficiently storing and accessing variable size units of compressed data in main memory are now known, for example, and described in: commonly-owned U.S. Pat. No. 5,761,536 entitled SYSTEM AND METHOD FOR REDUCING MEMORY FRAGMENTATION BY ASSIGNING REMAINDERS TO SHARE MEMORY BLOCKS ON A BEST FIT BASIS; commonly-owned U.S. Pat. No. 5,864,859, entitled SYSTEM AND METHOD OF COMPRESSION AND DECOMPRESSION USING STORE ADDRESSING; and, a reference authored by P. Franaszek and J. Robinson entitled DESIGN AND ANALYSIS OF INTERNAL ORGANIZATIONS FOR COMPRESSED RANDOM ACCESS MEMORIES, IBM Research Report RC 21146, IBM Watson Research Center, Oct. 20, 1998.

In the case where main memory is compressed, it is natural to identify the unit of compression as a line size; for purposes of description, in a computer system with three levels of caching (L1, L2, L3), the main memory will be referred to as L4, and the unit of compression will be referred to as the L4 line size. As an example, the L1 and L2 caches could have line sizes of 64 bytes, the L3 cache could have a line size of 256 bytes, and L4 (main memory) could have a line size (that is, size of the unit of compression) of 1024 bytes. FIG. 1 illustrates a cache/memory hierarchy with CPU 110, main memory $L_n$ 160, and multiple cache levels $L_i$ 120, $L_{i-1}$ 130, $L_j$ 140, $L_{n-1}$ 150.

FIG. 2 illustrates a conventional cache directory 210 for a 4-way set associative cache that implements a 4-way content addressable memory 220 to determine whether a line corresponding to a given memory address is currently stored in the cache, and if so, its location and status. To determine whether $L_{i-1}$ includes a line of size s (s=256 bytes, for example) corresponding to a CPU generated address "A", e.g., a 32-bit or 64-bit address, including tag bits 200 ("tag") and offset bits 201 ("offset"), the set 215 corresponding to the offset 201 (in this example j) is found in the $L_{i-1}$ cache directory 210, and the tag 200 is compared to all tags 216, 217, 218, 219 in set 215 of the $L_{i-1}$ cache directory 210 using a 4-way content addressable memory 220 (i.e., comparators). As a result of the comparison, there will be generated either 0 or 1 matches, and if a match exists, the index of the match is used to find the corresponding line of size s in cache $L_{i-1}$. Once the line is found, it is gated to a cache output-data buffer for use by the system/processor. FIG. 2 corresponds to the cache directory portion as illustrated in FIG. 2–7 on page 38 of Stone.

Referring back to FIG. 1, due to possible differences in line sizes between L2 and L3 caches, and between L3 and L4 (main memory), certain problems in efficient operation may occur. In an example scenario, consideration is given to the interface between L3 cache and L4 in the case that main memory (L4) is compressed, and with line sizes as in the previous example. Additionally, it is assumed that caches are of the store-in type, that is, when a line in L3 cache is replaced, if the line is marked as modified, it is necessary to first write the line to L4 (referred to as a writeback). Since the L4 lines are compressed and of size 1024 bytes (when uncompressed), and given that the L3 cache lines are of size 256 bytes, this may involve decompressing the L4 line, performing the writeback (i.e., writing the appropriate 256 byte section of the 1024 byte uncompressed L4 line using the modified data in the 256 byte L3 line), and then re-compressing the L4 line. If a sequence of L3 writebacks from different modified L3 lines occur to the same L4 line, this would involve repeated decompressions and re-compressions for the same L4 line, which may result in excessive overhead. An approach for solving this problem is as follows: at the time the L3 line is written back, find all other modified L3 lines residing in the same L4 line, and write back all such L3 lines; that is, "batching" L3 writebacks. However, current techniques for cache directory design may result in this being an expensive operation. As described in the previously cited text book by Stone for example, a cache directory may be organized using a number of associativity sets, and a content addressable memory may be used to determine whether a line with a given address is in the cache in the associated set (see Stone, Section 2.2.2, pages 36–44). Using the usual mapping of addresses to sets, the four consecutive 256 byte L3 lines residing in a 1024 byte L4 line will be in four consecutive sets. In order to check whether each line is in the L3, and if so, whether it is modified, the L3 cache directory must be accessed four times. This problem is made worse for increasing differences between L3 and L4 line sizes. For example, with a 64 byte L3 line size, the L3 cache directory would have to be accessed 16 times in order to find all modified L3 lines residing in a given 1024 byte L4 line (because 16×64=1024).

Similar problems occur in certain situations even when there is no memory compression. Consider the previous example of an L3 line size of 256 bytes and an L2 line size of 64 bytes. It has been found advantageous, in memory hierarchy design, due to considerations having to do with cache coherency in multiprocessor designs and correct functioning of the I/O system in both uniprocessor and multiprocessor designs, to incorporate a principle known as inclusion. This is defined in the previously referenced text book by Hennessy and Patterson as follows (page 723):

every level of cache hierarchy is a subset of the level further away from the processor.

In the context of the current example, inclusion requires that when a 256 byte line is replaced in the L3, if any of the four 64 byte lines residing in the 256 byte line are currently present in the L2 (or in a multiprocessor system with multiple L2 caches, each for a different processor, any such L2), these lines must be marked as invalid (with a writeback required before invalidation if the line is marked as modified). As in the previous example, using current cache design techniques, this requires four L2 cache directory accesses (or in a multiprocessor system, four L2 cache directory accesses for every L2 cache). As before, this problem is made worse with increasing differences between L2 and L3 line sizes.

It would thus be highly desirable, in a computer system with multiple levels of caches $L_1, L_2, \ldots, L_{n-1}$ and main memory $L_n$ and in which for some level of the memory hierarchy $L_{i-1}$ the line size s of $L_{i-1}$ is smaller than the line size t of $L_i$, to provide a mechanism whereby all lines in $L_{i-1}$ that reside in any given line in $L_i$ can be found quickly and efficiently without requiring multiple accesses (t/s accesses are required in the above examples) to the cache directory of $L_{i-1}$.

SUMMARY OF THE INVENTION

It is an object of the present invention to provide in a computer system having a processor, a memory system including multiple levels of caches $L_1, L_2, \ldots, L_{n-1}$ and including main memory $L_n$, and in which the cache $L_{i-1}$ includes lines of size s and the cache $L_i$ includes lines of size t with t>s, a dual line size cache directory structure for the contents of a cache level $L_{i-1}$ that, in addition to determining (as conventional) whether $L_{i-1}$ includes a line of size s corresponding to an address and if so its location and status, the additional ability to determine whether cache level $L_{i-1}$ contains any of the t/s lines of size s residing in the larger line of size t corresponding to the address, and if so their locations and status in cache level $L_{i-1}$ without multiple accesses to the cache $L_{i-1}$ directory structure.

It is a further object of the present invention to provide a dual line size cache directory structure as in the previous object that further includes a batched writeback mechanism responsive to determination of a single line of size s in cache level $L_{i-1}$ having a modified status for determining whether there exists other (t/s)−1 lines of size s residing in the larger line of size t that have a modified status, and concurrently writing back the one or more lines of size s that have been modified in the cache level $L_{i-1}$ to the cache level $L_i$.

Thus, according to the principles of the invention, there is provided in a computer system having a processor, a memory system including multiple levels of caches $L_1, L_2, \ldots, L_{n-1}$ and including main memory $L_n$, and in which the cache $L_{i-1}$ includes lines of size s and the cache $L_i$ includes lines of size t with t>s, a cache directory system for the contents of cache $L_{i-1}$ comprising a dual line size cache directory structure including a first device for determining whether the cache $L_{i-1}$ includes a line of size s corresponding to an address, and, a second device for determining whether the cache $L_{i-1}$ includes any of the t/s lines of size s residing in the larger line of size t corresponding to the address in the cache level $L_i$ without multiple accesses to the cache $L_{i-1}$ directory structure. The second device further utilizes tag and offset information provided in the address for determining the locations and status of each t/s lines of size s residing in the larger line of size t without multiple accesses to the cache $L_{i-1}$ directory structure. The cache directory may be implemented in systems whereby a lowest level $L_i$ comprises compressed or uncompressed memory.

Advantageously, the dual line size cache directory structure may be used to effectively implement the inclusion property whereby, in response to eviction of a line of size s in cache level $L_{i-1}$ that is to be replaced with new data contents, the status of each of smaller lines residing in a cache level $L_{i-2}$ may be concurrently modified as being invalid without multiple accesses to a cache level $L_{i-2}$ directory.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Figure 1:
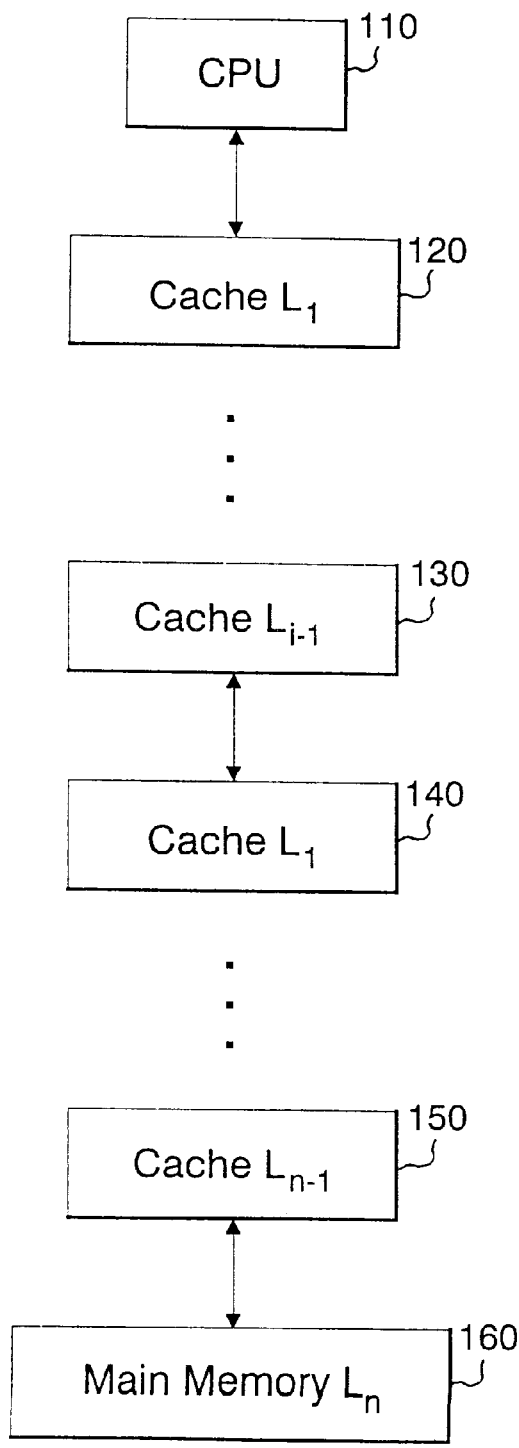
FIG. 1 illustrates the conventional cache/memory hierarchy in a computer system.

With reference to the cache/memory hierarchy depicted in FIG. 1, for purposes of description herein, the cache $L_{i-1}$ 130 is defined to possess a line size s, and cache $L_i$ 140 is defined to possess a line size t, with $2 \leq i \leq n$, $n \geq 2$, and t>s.

Figure 2:
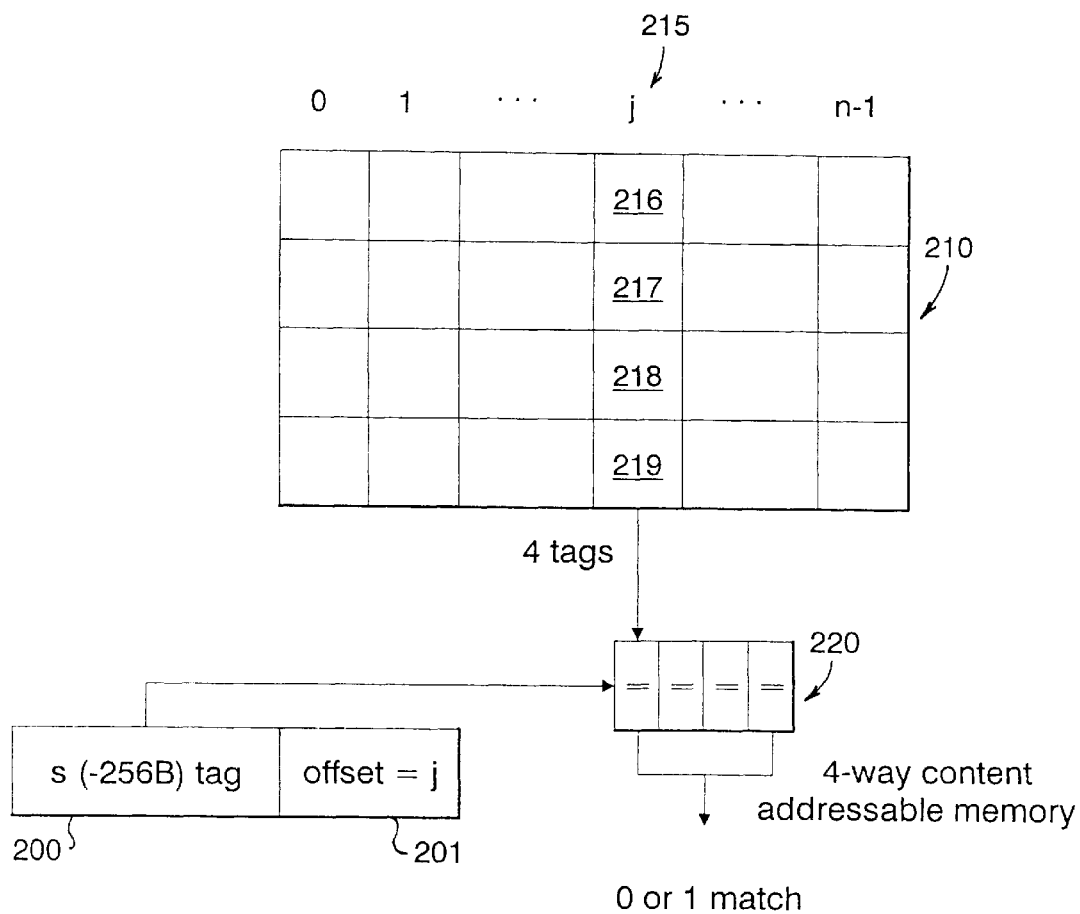
FIG. 2 illustrates a cache directory design for a 4-way set-associative cache in accordance with the prior art.
Figure 3:
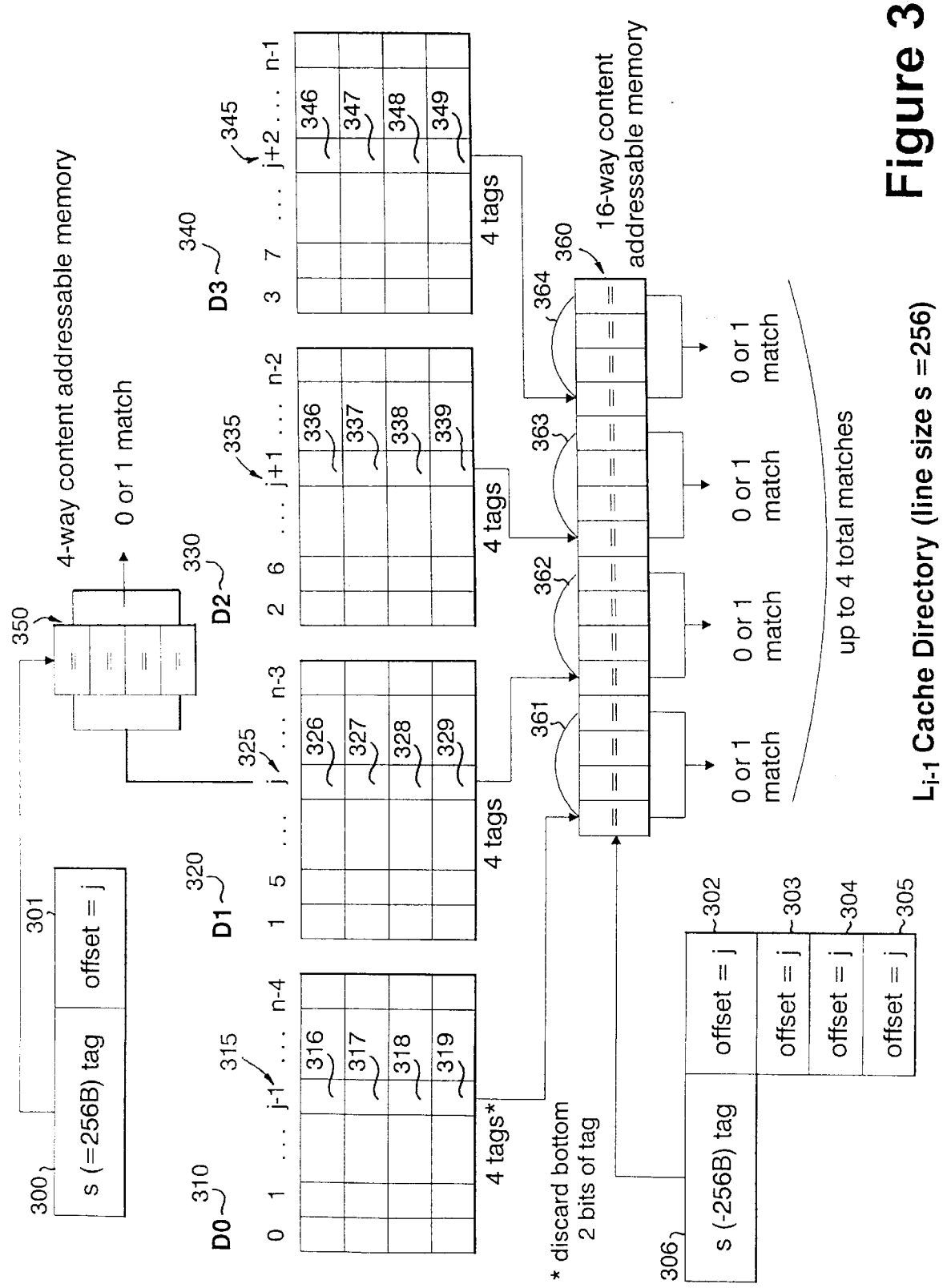
FIG. 3 illustrates a dual line size cache directory (4-way Set-Associative; t/s=4) in accordance with the present invention; and, FIG. 4 illustrates an example of batching writebacks using the dual line size cache directory of FIG. 3.

FIG. 3 illustrates an embodiment of the invention for providing a mechanism to determine all lines in a higher cache level (in the example described hereinabove, cache $L_{i-1}$) that reside in any given line in a lower cache level ($L_i$) without requiring multiple accesses to the cache directory of the higher cache level ($L_{i-1}$). For purposes of discussion, it is understood that a higher cache level refers to one that is closer to the CPU. In accordance with the preferred embodiment, the cache directory for $L_{i-1}$ is divided into four sections 310, 320, 330, 340 that together comprise the same information as the cache directory for $L_{i-1}$ 210 in FIG. 2. In conventional operation, to determine whether $L_{i-1}$ includes a line of size s (in this example s=256 bytes) corresponding to address A consisting of tag 300 and offset 301, the set 325 corresponding to the offset 301 (in this example j) is found in the appropriate piece of the $L_{i-1}$ cache directory 320, and the tag 300 is compared to all tags 326, 327, 328, 329 in set 325 of the $L_{i-1}$ cache directory 320 using a 4-way content addressable memory 350. Once the comparison has been made, there will be either 0 or 1 matches, and as described in the above cited reference to Stone (see Stone, Section 2.2.2, page 38), if a match exists the index of the match is used to find the corresponding line of size s in cache $L_{i-1}$. The $L_{i-1}$ cache directory 310, 320, 330, 340 can also be used to find all lines of size s in $L_{i-1}$ that reside in any given line of size t (t=1024 bytes in this example) in $L_i$ corresponding to address A without multiple accesses to the $L_{i-1}$ cache directory. The offsets 302–305 determine the 4 sets 315, 325, 335, 345 that must be examined to find a possible match with the line size t tag 306. (The offset for the larger line size is aligned on a 1024 byte boundary, and thus yields offsets corresponding to j−1, j, j+1, j+2, in this example.) The tags 316, 317, 318, 319 in set 315 corresponding to the offset 302

(in this example j−1) are presented to a section 361 of the 16-way content addressable memory 360; tags 326, 327, 328, 329 in set 325 corresponding to the offset 303 (in this example j) are presented to section 362 of 360; tags 336, 337, 338, 339 in set 335 corresponding to the offset 304 (in this example j+1) are presented to section 363 of 360; and, tags 346, 347, 348, 349 in set 345 corresponding to the offset 305 (in this example j+2) are presented to section 364 of 360. Each of the four sets of comparators 361, 362, 363, 364 has as input, the line size t tag 306, and each can have 0 or one match, leading to up to 4 totals matches in the 16-way content addressable memory 360. As in the conventional case, if a match exists the index of the match is used to find the corresponding line of size s in cache $L_{i-1}$.

The invention, as described above, may be implemented for performing batched writebacks of cache lines. A batched writeback may be performed when a line of size s in cache $L_{i-1}$ is being evicted and must be written back because it is modified, and there are other modified lines of size s in cache $L_{i-1}$ that, along with the line that is being evicted reside in a line of size t (t>s, in this example t/s=4) in cache $L_i$. When batched writebacks are performed, all other modified pieces of the line of size t in $L_i$ currently residing in $L_{i-1}$ will also be written back, and the $L_{i-1}$ cache directory entries for these lines will be updated to reflect that they are no longer modified.

Figure 4:
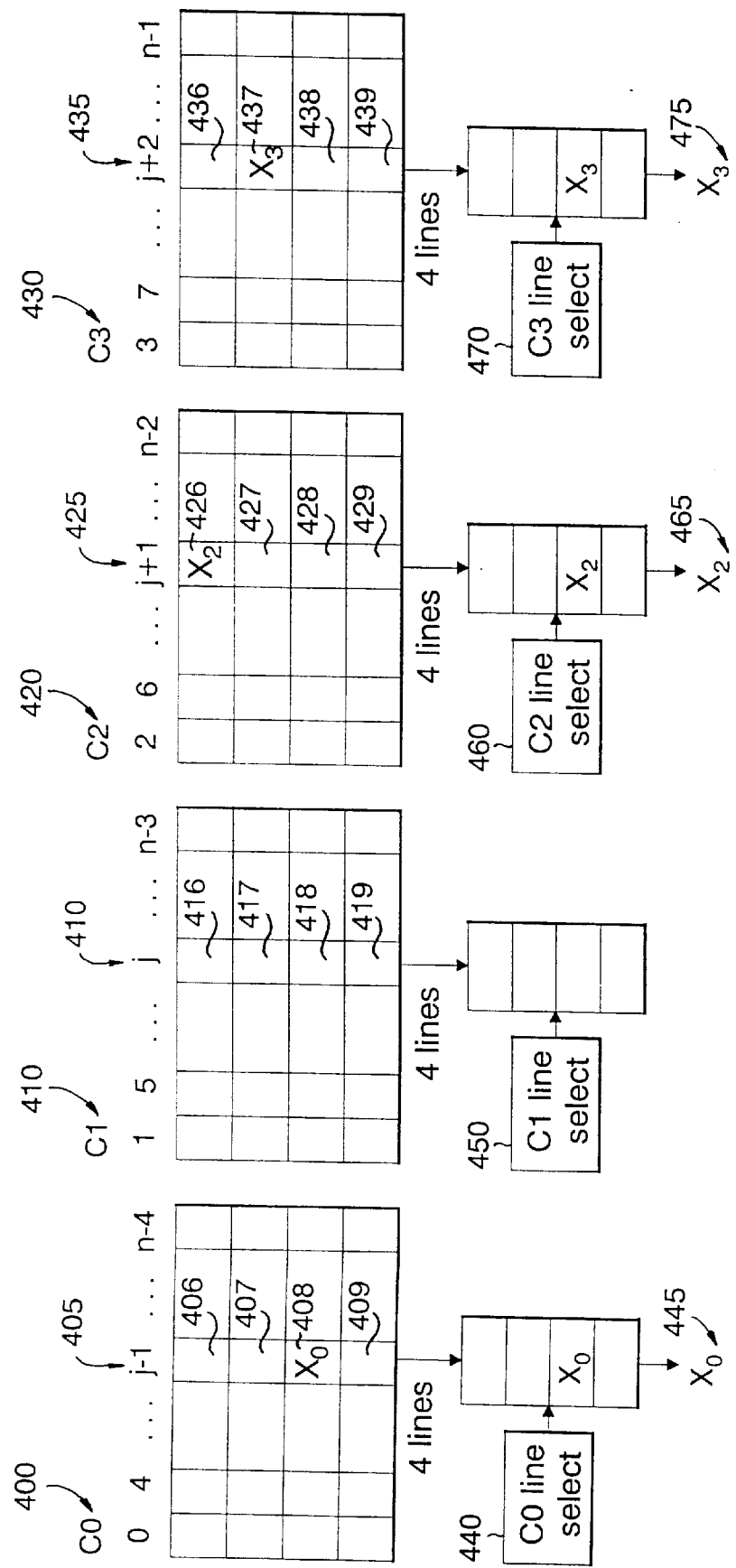

FIG. 4 illustrates an example of batching writebacks using the dual line size cache directory of FIG. 3. As shown in FIG. 4, the $L_{i-1}$ cache is divided into four sections 400, 410, 420, 430. Once the directory entries for all lines of size s in $L_{i-1}$ that reside in a line of size t in $L_i$ have been found, as shown in FIG. 3, it is possible to determine which of the lines in the $L_{i-1}$ cache are currently modified from the directory entries. The modified lines in $L_{i-1}$ are found by selecting the 4 sets 405, 415, 425, 435 (the offset 301 in FIG. 3 determines these 4 sets; it is the original offset 301 aligned on a 1024 byte boundary since t=1024 in this example), then using the indices of matches 440, 450, 460, 470 calculated by the 16-way content addressable memory (360 in FIG. 3) to select which lines are present and modified in $L_{i-1}$. These lines 445, 465, 475 can then be combined and written back to the corresponding line in $L_i$.

It is understood that skilled artisans may easily apply the principles of the present invention as described herein, for applications requiring inclusion. Thus, for example, when a 256 byte line is replaced in the L3, if any of the four 64 byte lines residing in the 256 byte line are currently present in the L2 (or in a multiprocessor system with multiple L2 caches, each for a different processor, any such L2), these lines may be marked as invalid (with a writeback required before invalidation if the line is marked as modified).

Although a detailed description is provided for the case of indirectly addressed main memory as used in a compressed main memory system, it should be understood that the invention can also be used for other applications of indirectly addressed main memory.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. In a computer system having a processor, a memory system including multiple levels of caches $L_1, L_2, \ldots, L_{n-1}$ and including main memory $L_n$, and in which the cache $L_{i-1}$ includes lines of size s and the cache $L_i$ includes lines of size t with t>s, a cache directory system for the contents of cache $L_{i-1}$ comprising:

a dual line size cache directory structure including:
   a) a first mechanism for determining whether said cache $L_{i-1}$ includes a line of size s corresponding to address A, said address A including tag and offset information utilized by said first mechanism for determining a set within said directory structure and a location and status of said line of size s represented in said set; and,
   b) a second mechanism for determining whether said cache $L_{i-1}$ includes any of the t/s lines of size s residing in the larger line of size t corresponding to said address A in said cache level $L_i$, the larger line of size t corresponding to said address A in said cache level $L_i$, said second mechanism utilizing said tag and offset information for determining t/s sets and the locations and status of said t/s lines of size s residing in said larger line of size t, wherein all lines of size s that reside in a line of size t are determined simultaneously in said cache $L_{i-1}$ directory structure.

2. The cache directory system as claimed in claim 1, wherein said dual line size cache directory structure is for an n-way set-associative cache, said second mechanism including (n·t/s)-way content addressable memory for comparing said tag provided in said address A associated with said larger line of size t in said cache level $L_i$ with n tags provided in each of said t/s sets, whereby said second mechanism further determines the modification status of each said t/s lines of size s in the cache level $L_{i-1}$.

3. The cache directory system as claimed in claim 2, wherein said directory structure is organized as one or more independently accessible components, said second mechanism accessing each independently accessible component in parallel for determining said t/s sets and the locations and status of said t/s lines of size s residing in said larger line of size t.

4. The cache directory system as claimed in claim 3, further including batched writeback mechanism wherein, responsive to determination of a single line of size s in cache level $L_{i-1}$ having a modified status, said batched writeback mechanism determining whether there exists other (t/s)−1 lines of size s residing in the larger line of size t that have a modified status, and concurrently writing back said one or more lines of size s that have been modified in said cache level $L_{i-1}$ to said cache level $L_i$.

5. The cache directory system as claimed in claim 4, wherein for each line of size s written back, said batched writeback updating the associated $L_{i-1}$ cache directory entries to reflect that said lines are no longer modified.

6. The cache directory system as claimed in claim 3, wherein said cache level $L_{i-2}$ includes lines of size r and the cache $L_{i-1}$ includes lines of size s with s>r, said system further including a mechanism adhering to an inclusion property wherein, responsive to eviction of a line of size s in cache level $L_{i-1}$ that is to be replaced with new data contents, said inclusion mechanism concurrently and simultaneously modifying a status of each of the s/r lines residing in said cache level $L_{i-2}$ associated with said cache level $L_{i-1}$ line as invalid in said cache level $L_{i-2}$ directory.

7. The cache directory system as claimed in claim 6, wherein prior to said concurrently modifying a status of each of the s/r lines residing in said cache level $L_{i-2}$ as invalid, said inclusion mechanism further including batched writeback of one or more said all s/r lines of said modified status residing in said cache level $L_{i-2}$ to said associated line in said cache level $L_{i-1}$.

8. The cache directory system as claimed in claim 1, wherein said cache level $L_i$ is a main memory.

9. The cache directory system as claimed in claim 1, wherein main memory contents are maintained in compressed form, a line size t of cache level $L_i$ being the size of a unit of compression of the compressed main memory.

10. In a computer system having a processor, a memory system including multiple levels of caches $L_1, L_2, \ldots, L_{n-1}$ and including main memory $L_n$, and in which the cache $L_{i-1}$ includes lines of size s and the cache $L_{i-2}$ includes lines of size r with s>r, a cache directory system for the contents of cache $L_{i-1}$ comprising:

a dual line size cache directory structure including:
 a) a first mechanism for determining whether said cache $L_{i-1}$ includes a line of size s corresponding to address A, and,
 b) a second mechanism for determining whether said cache $L_{i-1}$ includes any of the t/s lines of size s residing in the larger line of size t corresponding to said address A in said cache level $L_i$ said address A including tag and offset information utilized by said second mechanism for determining the locations and status of said t/s lines of size s residing in said larger line of size t simultaneously in said cache $L_{i-1}$ directory structure; and,
 c) batched writeback mechanism wherein, responsive to determination of a single line of size s in cache level $L_{i-1}$ having a modified status, said batched writeback mechanism determining whether there exists other (t/s )-1 lines of size s residing in the larger line of size t that have a modified status, and concurrently writing back said one or more lines of size s that have been modified in said cache level $L_{i-1}$ to said cache level $L_i$.

11. The cache directory system as claimed in claim 10, wherein for each line of size s written back, said batched writeback updating the associated $L_{i-1}$ cache directory entries to reflect that said lines are no longer modified.

12. In a computer system having a processor, a memory system including multiple levels of caches $L_1, L_2, \ldots, L_{n-1}$ and including main memory $L_n$, and in which the cache level $L_{i-2}$ includes lines of size r, the cache level $L_{i-1}$ includes lines of size s and the cache $L_i$ includes lines of size t with r<s<t, a cache directory system for the contents of cache $L_{i-1}$, and $L_{i-2}$ comprising:

a dual line size cache directory structure including:
 a) a first mechanism for determining whether said cache $L_{i-1}$ includes a line of size s corresponding to address A, and,
 b) a second mechanism for determining whether said cache $L_{i-1}$ includes any of the t/s lines of size s residing in the larger line of size t corresponding to said address A in said cache level $L_i$ said address A including tag and offset information utilized by said second mechanism for determining the locations and status of said tis lines of size s residing in said larger line of size t simultaneously in said cache $L_{i-1}$ directory structure; and,
a mechanism adhering to an inclusion property wherein, responsive to eviction of a line of size s in cache level $L_{i-1}$ that is to be replaced with new data contents, said inclusion mechanism concurrently and simultaneously modifying a status of each of the s/r lines residing in said cache level $L_{i-2}$ associated with said cache level $L_{i-1}$ line as invalid in said cache level $L_{i-2}$ directory.

13. The cache directory system as claimed in claim 12, wherein prior to said concurrently modifying a status of each of the s/r lines residing in said cache level $L_{i-2}$ as invalid, said inclusion mechanism further including batched writeback of one or more said all s/r lines of said modified status residing in said cache level $L_{i-2}$ to said associated line in said cache level $L_{i-1}$.

* * * * *

UNITED STATES PATENT AND TRADEMARK OFFICE
CERTIFICATE OF CORRECTION

PATENT NO.     : 6,587,923 B1
DATED          : July 1, 2003
INVENTOR(S)    : C. D. Benveniste et al.

It is certified that error appears in the above-identified patent and that said Letters Patent is hereby corrected as shown below:

Title page,
Item [75], Inventors, "Kisco" should read -- Mt. Kisco --

Drawings,
Sheet 1 of 4, after "FIGURE 1" insert -- Prior Art --

Column 8,
Line 21, "tis" should read -- t/s --

Signed and Sealed this

Twenty-fifth Day of May, 2004

JON W. DUDAS
*Acting Director of the United States Patent and Trademark Office*